Aug. 23, 1960     C. VAN DER LELY ET AL     2,949,719
SIDE DELIVERY RAKE AND MOWER

Filed July 6, 1956     2 Sheets-Sheet 1

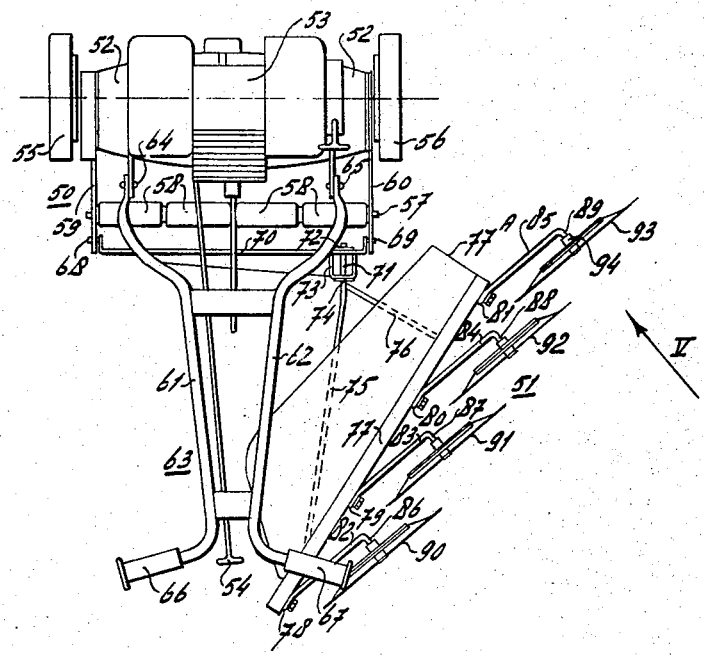

United States Patent Office 2,949,719
Patented Aug. 23, 1960

2,949,719

SIDE DELIVERY RAKE AND MOWER

Cornelis van der Lely and Ary van der Lely, Maasland, Netherlands, assignors to Cornelis van der Lely, Maasland, Netherlands Filed July 6, 1956, Ser. No. 596,227

Claims priority, application Netherlands July 26, 1955

6 Claims. (Cl. 56—193)

The present invention relates to devices for mowing and raking lawns.

The raking of lawns is effected in various known manners. In one procedure, mown grass is swept into a heap by means of a broom or the like. Sometimes special lawn rakes are used which consist of a fan-like structure constituted by bamboo sections having bent extremities, which fan is attached to a handle for raking the mown grass together. Both said methods take up very much time.

Another method employs a container mounted behind a lawn mowing machine, into which container the grass thrown upwards by the mowing machine will immediately fall.

This type of container can contain, however, only a limited quantity of grass. During the mowing operation, it is therefore necessary to stop again and again to remove and to empty the container and to couple it again to the mowing machine. For this reason this method is also very unsatisfactory.

It is an object of the present invention to provide an improved device with which it is possible to rake the lawn in a very efficient way.

The invention is based on the insight that, though lawns are generally provided with flowerbeds and borders and so forth having complicated shapes, the grass left on a lawn can be removed almost entirely by a stripwise treatment, as lawn mowing is also effected stripwise. According to the present invention, the mown grass is heaped up in one or more swaths by means of a side delivery rake operating along a strip.

Characteristics, features and details of the present invention will appear from the following description with reference to the drawing illustrating two embodiments of the present invention.

Fig. 4 is a plan view of a second embodiment of the invention.

Fig. 5 shows a side elevational view of a part of said device viewed in the direction of arrow V in Fig. 4.

Figure 1:
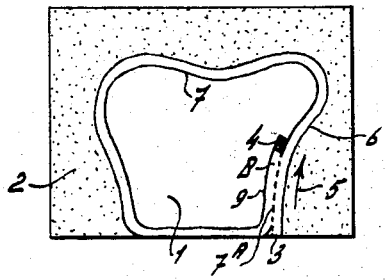
Fig. 1 shows a plan view of a lawn which is worked in accordance with the invention.

In Fig. 1 is represented a lawn 1 surrounded by a border 2. After the grass is mown on lawn 1, a side delivery rake 4 delivering to the left and indicated diagrammatically by a rectangle, starts at 3 and moves forward in the direction of the arrow 5 along the periphery 6 of the lawn 1, during which movement the cut grass is laid in a small swath 7. After the side delivery rake 4 completes a turn along the periphery 6, it moves further along the swath 7. Preferably, not only is the grass lying on the strip 8 delivered to a swath 9 during the second round, but also part 7a of the swath 7. During a following round, all the grass can be heaped up a swath which is still more remote from the edge 6, so that finally all the grass will be piled in one heap.

Figure 2:
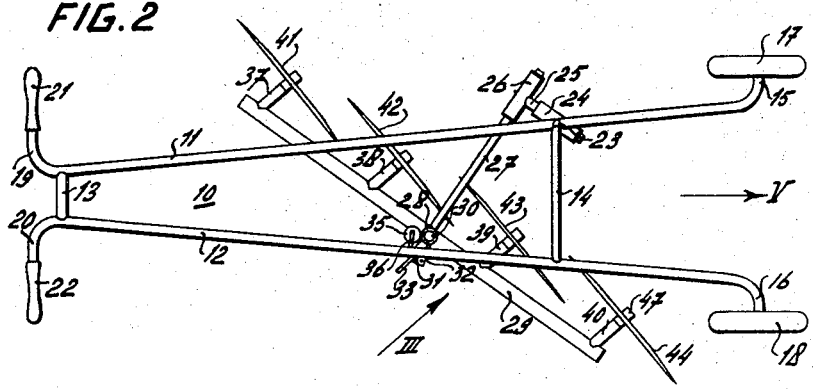
Fig. 2 represents a plan view of a first embodiment of the invention.
Figure 3:
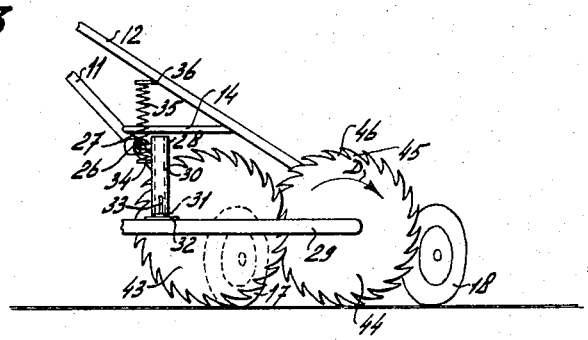
Fig. 3 shows a fragmentary side view of a part of said device viewed in the direction of arrow III in Fig. 2.

For performing the workings described, the side delivery rake shown in Figs. 2 and 3 is particularly suitable. Said rake comprises a frame 10 consisting of two long tubes 11 and 12 which are mutually connected by two short tubes 13 and 14. The foreparts 15 and 16 of the tubes 11 and 12 are bent to the outside and form axles for two running wheels 17 and 18. The rear ends 19 and 20 of the tubes 11 and 12 are also bent to the outside and carry handles 21 and 22 which during operation can be located at a height of about 1.1 yards above the ground. A tube 24 which is horizontal in the normal working position of the frame 10 is fixedly mounted on the tube 11 at the connecting point 23 of the tubes 11 and 14. An axle 25 is rotatably supported in said tube 24. The axle 25 is fixedly connected to a tube 26 which is horizontal during normal operation and which is perpendicular to the axle 25. A bar 27 is rotatably supported in the tube 26. Said bar 27 makes an angle of about 50° with the normal travelling direction V of the device. The rear end of the bar 27 carries a tube 28 which is substantially vertical during operation, in which tube 28 is rotatably supported a pin 30 which is rigidly mounted at right angles to a beam 29. The lower side of the tube 28 carries a perforated segment 31 and the lower side of the pin 30 carries a perforated segment 32 situated below the segment 31. A locking pin 33 can be put through the segments 31 and 32 for securing the beam 29 in the position shown in Fig. 2 or in any one of a small number of adjacent positions with regard to the bar 27. The tube 28 is connected at 34 to the lower end of a draw spring 35, the upper end of which is coupled at 36 to the tube 12.

Further, the beam 29 carries four short, mutually parallel axles 37, 38, 39 and 40 extending obliquely forward, on which rake wheels 41, 42, 43 and 44 are mounted so as to be freely rotatable. During the travelling movement of the device in the direction V each rake wheel moves with a partly sliding and partly rolling motion over the ground, during which the rolling movement causes the wheels to rotate in a direction which for the rake wheel 44 is indicated by an arrow D (see Fig. 3). The rake wheel 44 is provided with circumferential tines, such as tines 45 and 46, which extend rearwards with regard to the direction of rotation and which are shaped of a single plastic disc mounted on a hub 47. The rake wheels 41, 42 and 43 have the same construction as the rake wheel 44 and their tines also extend rearwards with regard to the direction of rotation. Owing to this, during the forward movement of the rake over a strip of the lawn, the grass falls easily from the rear side of each rake wheel where the periphery of the wheel moves upwards. The mown grass met during said forward movement of the rake wheel 44 is pushed obliquely to the left and the grass comes to lie in front of the rake wheel 43. After that, it is led to the rake wheel 42 along with other grass displaced by the wheel 43, and at last to the wheel 41, after which the grass is left at the left side of said wheel in the shape of a swath.

The rake wheels 41—44 rest on the ground with a pressure which in consequence of the action of the spring 35 and the rotatability of the axle 25 in the tube 24 can be rather small. As a result of the rotatability of the bar 27 in the tube 26 the pressure of the wheels 41—44 on the ground never can be distributed over these wheels in an unfavorable way and the wheels can adapt themselves to slight irregularities in the surface of the lawn within certain limits and independently of the position of the frame 10.

By placing the beam 29 in another position, owing to which said beam makes a greater angle with the travelling direction V, a broader strip can be covered. If only a rather small amount of grass which is not too short needs be displaced, the device can work having the beam in said new position. If very much or very short grass should be displaced, the beam 29 could preferably be turned, however, in the opposite direction.

The embodiment shown in Figs. 4 and 5 comprises a lawn mowing machine or device 50 to which a side delivery rake 51 is attached. The machine 50 is equipped with a gasoline motor 53 for driving the cutting means or blades of the machine as shown in Patent No. 2,623,343 of December 30, 1952, and the fuel supply for said motor which is mounted on a frame 52 can be adjusted by means of a handle 54. The frame 52 rests on wheels 55 and 56 and on a number of rollers 58 which are rotatable about an axle 57. The axle 57 is connected to the frame 52 by means of bars 59 and 60. A guide frame 63 composed substantially of two tubes 61 and 62 and hingedly connected to the frame 52 by pivots 64 and 65 is provided with handles 66 and 67 with which the machine can be manually guided forward or, if the motor 53 drives the wheels 55 and 56, directed.

The machine described so far as is of a known type. The machine shown in Fig. 4 carries, however, a strip 70 which is hingedly connected to the bars 59 and 60 by pivot means including pivots 68 and 69, said strip rotatably accommodating, at 72, a hinge axle 71. A supporting element 73 coupled to the strip 70 comprises at 74 a second bearing for the axle 71. The axle 71, which extends longitudinally along guide frame 63 is connected to a beam 77 by means of two bars 75 and 76. Said beam is provided with a plate 77A which is directed upwards and forward and which prevents the grass cut off by the machine 50 from being thrown over the beam 77. To the beam 77 are clamped at 78, 79, 80 and 81 four spring steel arms 82, 83, 84 and 85 which extend obliquely forward and downward. The bent lower parts 86, 87, 88 and 89 of these arms are about perpendicular to the arms 82–85 and are horizontal and mutually parallel. They constitute axles for four free-wheeling rake wheels 90, 91, 92 and 93 which are mounted on said axles 86–89 in echelon and so as to be freely rotatable. The rake wheels 90–93 all have the same construction which will be more fully described for the rake wheel 93. Said rake wheel comprises a hub 94 on which is mounted a disc 95 having circumferential spokes which extend through a perforated rim 97 and which are bent outside the same for constituting supporting members 98 for the tines 99. A tine 99, its supporting member 98 and the associated spoke 96 are made of a single piece of steel wire, the tine 99 being substantially parallel to the spoke 96. The spokes 96 lie in a plane which is perpendicular to the axle 89 and the tines 99 lie in a plane which is located more to the rear and perpendicularly to the axle 89.

If the device is moved over the lawn, the lawn mowing machine 50 mows a strip of grass, whereas the mown grass lying on an adjacent strip is put upon the newly mown strip behind the lawn mowing machine by means of the side delivery 51. In the device described, the working and the cooperation of the rake wheels are the same as those of the device according to Figs. 2 and 3. The beam 77 is rotatable about two mutually perpendicular axes, viz. about the axle 71 and the line defined by pivots 68–69, for enabling an exact arrangement of the rake wheels 90–93. The resiliency of the arms 82–85 is also favorable for adaptation to the ground. Further, each tine 99 can deflect about the center line of the spoke 96 for a considerable distance from the plane comprising the other tines, during which deflection the spoke 96 is subject to torsion. This construction not only results in that all rake wheels 90–93 can continually be in contact with the ground, but also in that four or five spokes of each wheel can come into contact with the ground at a time.

The plate 77A forms a screen insuring that all grass thrown upwards by the machine 50 falls down in front of the rake and thus can be delivered to the left.

While using said device, the rake 51 can be released from the lawn mowing machine 50 by removing the axle 71 from its bearings 72 and 74 and the first round along the periphery 6 (Fig. 1) of the lawn is made without the rake. During the following rounds, the rake 51 is attached to the lawn mowing-machine 50.

What is claimed is:

1. A lawn tending apparatus comprising a mowing device having a cutting means, wheels on the mowing device and supporting the same for ground traversing movement, a guide frame coupled to said device, handles on the guide frame for the manual guiding of the apparatus, and a side delivery rake coupled to the mowing device in trailing and laterally displaced relation to said mowing device, the rake including free-wheeling rake wheels arranged in echelon.

2. Apparatus as claimed in claim 1 comprising pivot means on the mowing device and transverse to said guide frame, the side delivery rake being pivotally coupled to the pivot means.

3. Apparatus as claimed in claim 1 comprising a hinge axle coupled between the mowing device and the side delivery rake, the hinge axle extending longitudinally along the guide frame.

4. Apparatus as claimed in claim 1 wherein the side delivery rake includes a plate disposed between the mowing device and rake wheels for limiting the dispersion of grass cut by the mowing device.

5. Apparatus as claimed in claim 1 wherein the side delivery rake includes a beam coupled to the mowing device and a plurality of arms fixed on the beam and supporting the rake wheels.

6. Apparatus as claimed in claim 3, said side delivery rake comprising a beam and bars connected between said beam and said hinge axle, said wheels being mounted on said beam.

References Cited in the file of this patent

UNITED STATES PATENTS

| | | |
|---|---|---|
| 877,658 | Mattress | Jan. 28, 1908 |
| 1,726,535 | Bowers | Sept. 3, 1929 |
| 1,750,033 | White | Mar. 11, 1930 |
| 1,823,387 | Campbell | Sept. 15, 1931 |
| 2,206,612 | Linaberry | July 2, 1940 |
| 2,240,168 | Adkisson | Apr. 29, 1941 |
| 2,472,260 | Morrill | June 7, 1949 |
| 2,511,842 | Gaterman | June 20, 1950 |
| 2,670,588 | Plant | Mar. 2, 1954 |
| 2,751,741 | Carson | June 26, 1956 |

FOREIGN PATENTS

| | | |
|---|---|---|
| 209,983 | Germany | May 21, 1909 |
| 89,495 | Switzerland | May 16, 1921 |
| 910,001 | Germany | Apr. 26, 1954 |